United States Patent [19]
McCallops et al.

[11] Patent Number: 5,881,612
[45] Date of Patent: Mar. 16, 1999

[54] FINGER GUARD FOR TUBENUT TOOLS

[75] Inventors: John A. McCallops, Sayre; Donald R. Warner, Columbia Cross Roads, both of Pa.

[73] Assignee: Ingersoll-Rand Company, Woodcliff Lake, N.J.

[21] Appl. No.: 812,552

[22] Filed: Mar. 7, 1997

[51] Int. Cl.⁶ ..................................................... B25B 13/00
[52] U.S. Cl. ............................................ 81/58.2; 81/57.11
[58] Field of Search ................................... 81/58.2, 57.11, 81/58.12, 57.15, 57.33

[56] References Cited

U.S. PATENT DOCUMENTS

| | | | |
|---|---|---|---|
| 2,518,088 | 9/1950 | Speilman | 81/58.2 |
| 2,758,493 | 8/1956 | Goldwater | 81/58.2 |
| 4,287,795 | 9/1981 | Curtiss | 81/58.2 |
| 5,259,276 | 11/1993 | Baron | 81/58.2 |
| 5,537,897 | 7/1996 | Wilson, Jr. | 81/58.2 |

*Primary Examiner*—David A. Scherbel
*Assistant Examiner*—Lee Wilson
*Attorney, Agent, or Firm*—Walter C. Vliet; Leon Nigohosian, Jr.

[57] ABSTRACT

A spring loaded guard is provided to limit access to a potential nip point formed between the rotating nut driver and its guide and wherein the guard extends beyond the guide housing a sufficient distance to engage the tubing for displacement of the guard for use in restricted access areas.

2 Claims, 2 Drawing Sheets

FINGER GUARD FOR TUBENUT TOOLS

BACKGROUND OF THE INVENTION

This invention relates generally to power driven wrenches and more particularly to a guard for tubenut wrench jaws. In a typical power driven tubenut tool a rotary driven nut engaging socket and a retaining or guide housing for the socket or jaw are provided with a radial access slot which are in alignment to permit the wrench to be slipped over a tube for engagement and for tightening or loosening a retaining tubenut. In operation, a pinch or nip point is created in the radial opening area as the jaw opening passes through the surrounding housing opening. It is therefore desirable to prevent access to the nip point area during tool operation or the possibility of accidental operation. Due to the typical use of tubenut wrenches, any guard must be self deployed and easily diverted to permit access of the tube and allow function of the tubenut wrench in restricted space often associated with hydraulic manifolds and the like.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a guard for a tubenut wrench comprising a tubenut wrench housing having a tubenut jaw disposed for rotation within the housing and which is selectively driven in rotation to effect rotation of a tubenut; the housing and the jaw being further provided with registered tube and nut slots respectively which in one registered position provide tube and nut access to the housing and nut access to the jaw; and, guard means for preventing accidental access to the tube and nut slots.

The foregoing and other aspects will become apparent from the following detailed description of the invention when considered in conjunction with the accompanying drawing figures.

BRIEF DESCRIPTION OF THE DRAWING FIGURES

FIG. 1 is a partial side elevation of a tubenut wrench showing a tubenut head and guard therefore according to the present invention; and FIGS. 2–5 show a plan or top view of a tubenut wrench head showing the guard according to the present invention in varying stages of deployment from initial placement for guard displacement to tube entry and guard enclosure.

DETAILED DESCRIPTION

Figure 1:
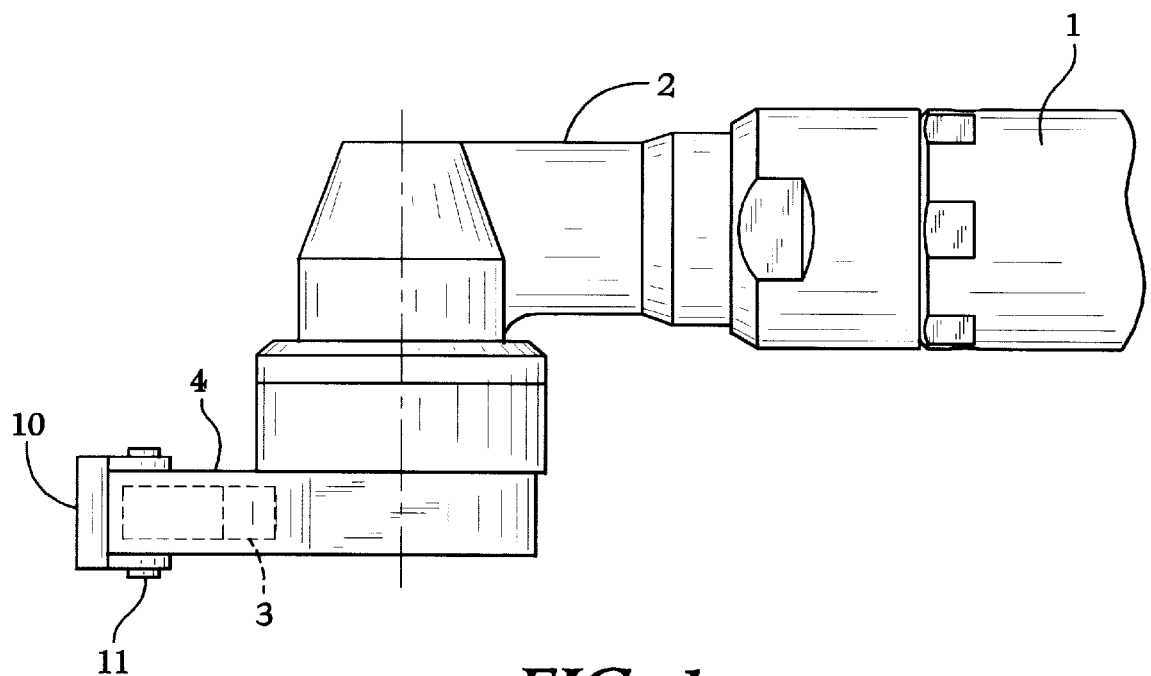
Figure 2:
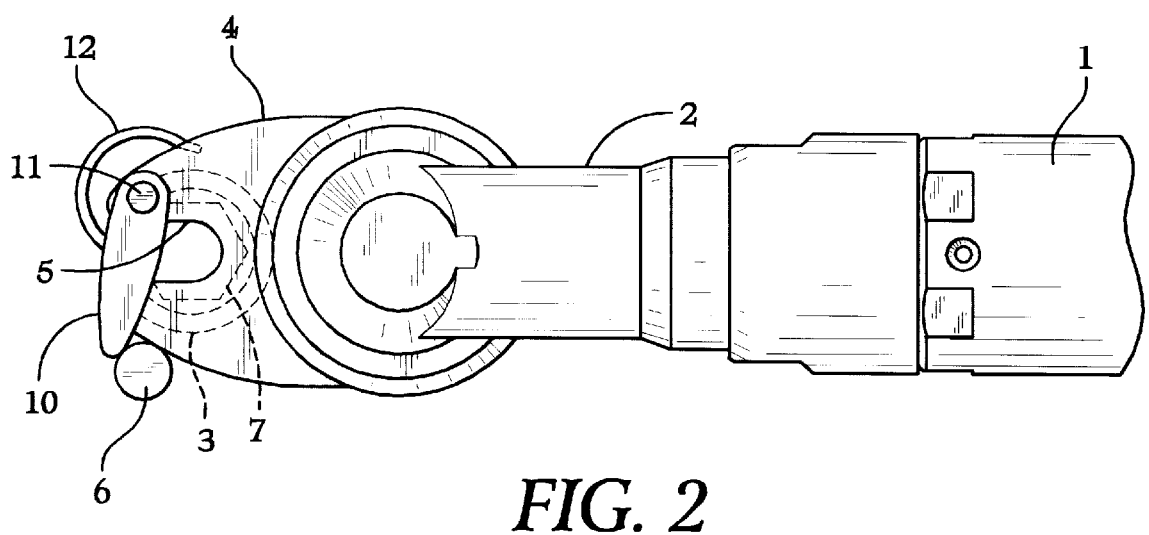
Figure 3:
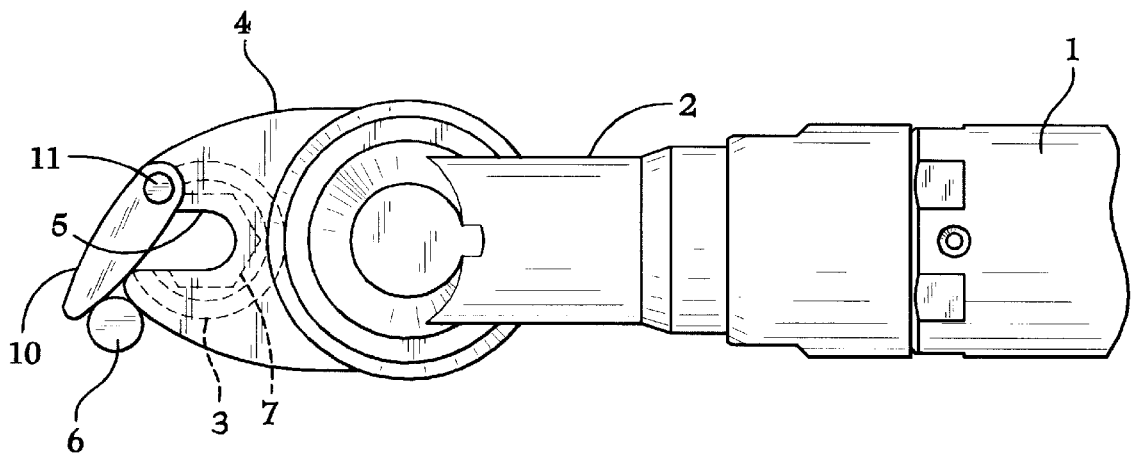
Figure 4:
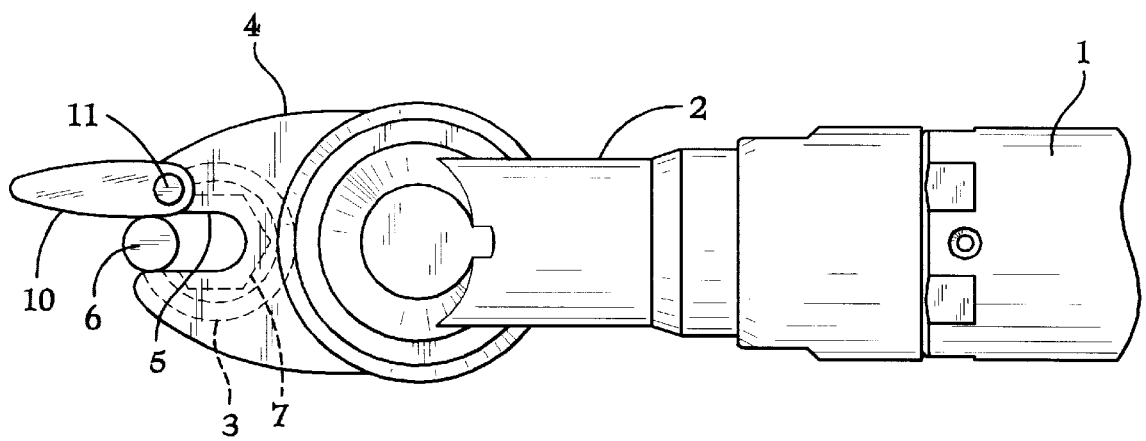

Referring to FIGS. 1 and 2, a tubenut driving power tool is partially shown and generally designated by the reference numeral 1. The tool is provided with a tubenut head adaptor 2 of a convenient angle offset head design commonly used in such wrenches. For purposes of the present invention it is sufficient for one skilled in the art to understand that upon selected drive operation, offset gearing in the gear head 2 produces rotary drive of the wrench head socket 3 about a vertical axis as viewed in FIG. 1. The jaw 3 is guided for rotation by appropriate bearing means contained within the jaw housing 4.

A radial disposed "U" shaped tube access slot 5, best seen in FIGS. 2–5, is provided to accept entry of a tube 6 into the jaw housing 4 as shown in sequence in FIGS. 2–5. A hexagonal radial disposed nut access slot 7 is also provided in the rotating jaw 3 to accept and rotate a tubenut used for securing the tubing to a manifold or the like. When the "U" shaped slot 5 and the hexagonal slot 7 are in vertical registry, as for example seen in FIG. 4, they are in position to allow entry of the tube 6 into position for the tubenut to be rotated. Absent a guard, an operator may inadvertently access the nip point created when the jaw 3 begins to rotate within the housing 4. According to the present invention this access may be prevented by a guard 10 which is attached to housing 4 by means of a pin connection 11. This permits the guard to rotate in and out of positions as indicated in FIGS. 2–5 to permit tube access to the jaw.

Figure 5:
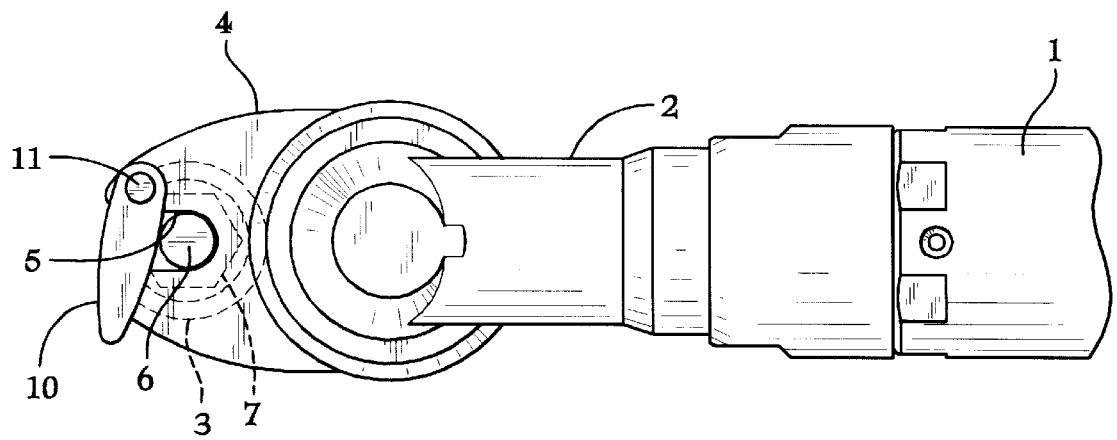

A "C" clip spring 12, as shown on FIG. 2, may be utilized to spring load the guard 10 into a closed position, as shown only for example in FIG. 2. The elongated teardrop shape of the guard 10 permits it to extend beyond the housing 4. This extension permits contact with the tube so that the operator may hook the guard 10 out and away from the housing 4, as shown in sequence in FIGS. 2, 3, and 4. This may be accomplished without the operator requiring finger access to the guard. With the guard displaced clockwise to the point shown in FIG. 4, the tube may enter the registered "U" shaped slot and hexagonal jaw slot 7.

once the tube 6 is in position to be rotated, as shown in FIG. 5, the guard 10 is rotated into its secure position by means of spring 12 which then prevents further access to the nip point during tool operation. Upon completion of the tubenut rotation procedure the wrench may be withdrawn simply by having the "U" shaped slot 5 and the tubenut slot 7 returned to registered vertical alignment and withdrawing the wrench past the spring loaded guard 10.

Having described our invention in terms of a preferred embodiment, we do not wish to be limited in the scope of our invention except as claimed.

What is claimed is:

1. A tubenut wrench guard comprising in combination:
    a tubenut wrench housing having a tubenut jaw disposed for rotation within said housing and which is selectively driven in rotation to effect rotation of a tubenut;
    said housing and said jaw being further provided with registered tube and nut slots respectively which in one registered position provide tube and nut access to said housing and nut access to said jaw; and
    spring-loaded guard means for preventing accidental access to said tube and nut slots, said guard means being pivotally mounted on said housing proximate said tube and nut slots to one side of said slots and extending therefrom a pivot point across said slots and sufficiently beyond to facilitate hooking a tube as a means of deploying said guard from a spring-loaded closed position to an open entry position.

2. A guard for a tubenut wrench according to claim 1 wherein:
    said guard means is further provided with a "U " shaped (viewed from one end) cross section to provide wrap around protection over a nip point formed at the entry to said slots when said housing tube slot and said jaw nut slot are driven out of registry upon driven tool operation.

* * * * *